Sept. 3, 1963  R. K. WILLIAMS ETAL  3,102,737
PRESSURE EQUALIZING TOW BAR FOR BOAT TRAILERS
Filed April 30, 1962  2 Sheets-Sheet 1

INVENTORS
ROBERT K. WILLIAMS,
JAMES E. BLAIR
BY Thomas P. Mahoney
ATTORNEY

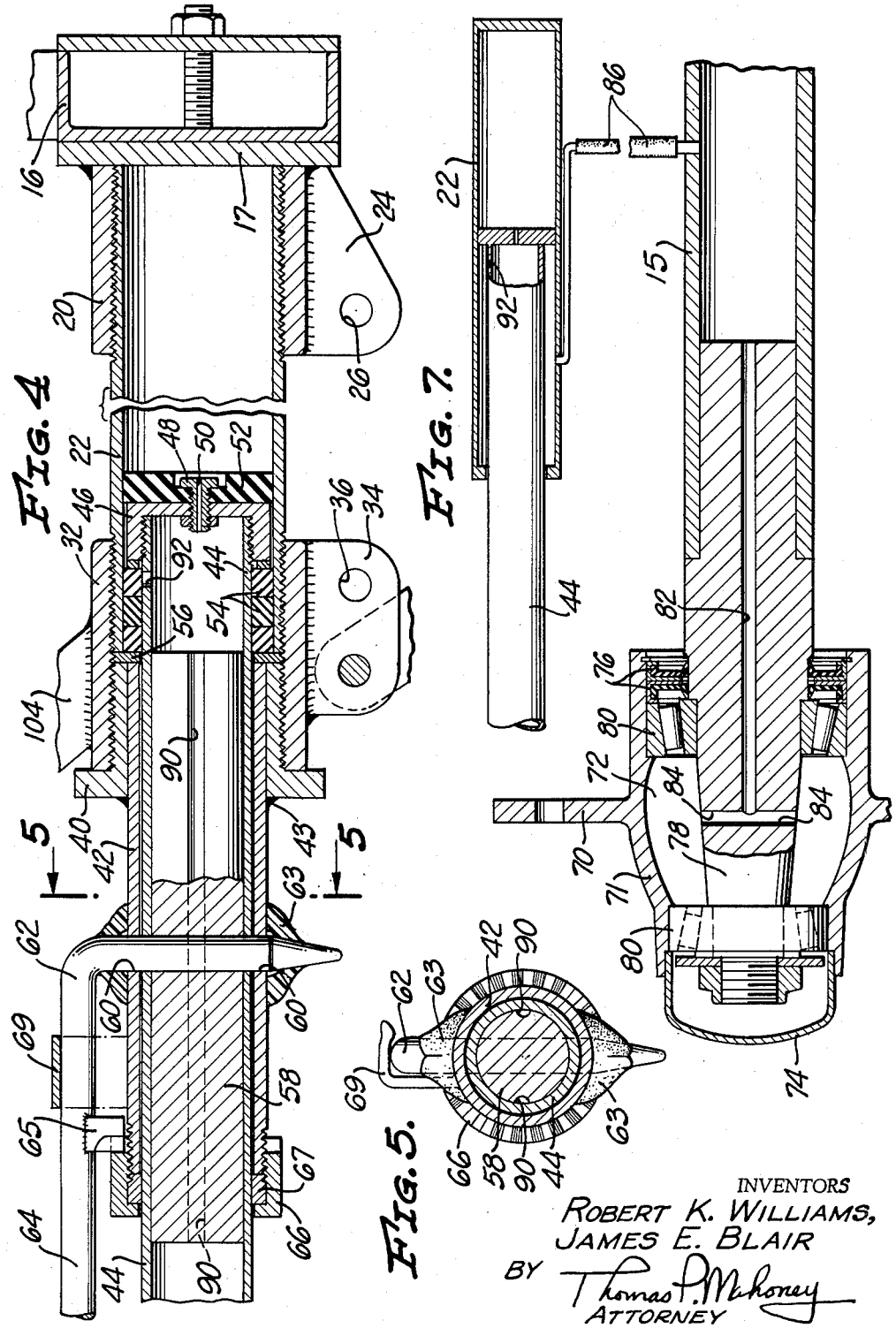

United States Patent Office 3,102,737
Patented Sept. 3, 1963

3,102,737
PRESSURE EQUALIZING TOW BAR FOR
BOAT TRAILERS
Robert K. Williams, 661 Country Club Drive, and James
E. Blair, P.O. Box 1128, both of Burbank, Calif.
Filed Apr. 30, 1962, Ser. No. 191,168
12 Claims. (Cl. 280—414)

The present invention relates to a pressure equalizing telescopic tow bar for boat trailers.

The present application is a continuation-in-part of our copending patent application, Serial No. 785,015, filed January 5, 1959, in the names of Robert K. Williams and James Eugene Blair, now Patent No. 3,032,353, dated May 1, 1962, and is particularly directed to a means for channeling air through the tow bar to the wheel bearings.

When it is desired to launch a boat from a boat trailer it is, of course, necessary to back the trailer into the water until the boat thereon is buoyed up by the water so that it can be released from the trailer without difficulty. This is the simplest and most widely used method for launching boats from boat trailers, but the launching of the boat by this means is unfortunately commonly accompanied by damage to the wheel bearings of the trailer by ingress of water.

Such damage to the wheel bearings is caused by the sudden cooling of the air in the wheel bearing housing when the bearing housing is suddenly immersed in cold water after having become heated during the hauling of the boat over land to the launching site. The ingress of water, and particularly salt water, is obviously damaging to the parts within the bearing housing and it is extremely difficult if not impossible to provide a seal adequate to resist the high differential pressure between the bearing housing and the ambient water during launching.

Accordingly, it is an object of the present invention to provide a telescopic tow bar constituted by sections which are preferably hollow and axially slidable one within the other, the outer section forming part of the trailer and including suitable passageways and couplings affording communication between the wheel bearing housings of a trailer and the outer section. More particularly, the outer section is connected by air hoses or lines, or by air passageways provided in the structure of the trailer, to the interior of the bearing housing so that when the trailer is immersed in water during a launching operation the reduced pressure caused by cooling of the air in the bearing housing is offset by the admission of air from the inner telescopic tow bar section to the outer section, and thence to the wheel bearing housing. Stated another way, the higher atmospheric pressure forces air through the present telescopic tow bar sections to the area of lower pressure within the wheel bearing housing, eliminating a prohibitive pressure differential between the interior of the wheel bearing housing and the ambient water about the submerged trailer.

Another object of the invention is to provide a pressure equalizing tow bar for a boat trailer which is constituted by a pair of telescopically connected sections provided with a sliding seal to prevent entry of water during the launching of the boat, the sections further being provided with sealing means actuable in the extended and retracted positions of the sections for preventing the entry of water. This last sealing means is rendered operative by a locking apparatus which urges the sealing means against the telescopic sections to compress the sealing means therebetween.

A further object of the invention is to provide a means which can readily be embodied in a telescopic tow bar for a boat trailer to vent the wheel bearing housings of the trailer, with relatively minor alterations and at a relatively low cost.

Yet another object of the invention is to provide a telescopic tow bar for trailers which is constituted by a piston-cylinder arrangement for connection between the trailer and the towing vehicle. With this arrangement, the extension and retraction of the telescoping sections are controlled by adjusting the displacement of air from one section to the other, and, further, the sections are arranged in fluid communication with the interior of the wheel bearing housings of the trailer to constantly vent air to such housings upon launching of the boat so that during a boat launching operation water is not sucked into the housing to contaminate the relatively delicate bearing structure therein.

Other objects and features of the invention will become apparent from consideration of the following description taken in connection with the accompanying drawings, in which:

FIG. 4 is a vertical cross sectional view of the tow bar;

FIG. 5 is a detail vertical sectional view of the locking rod and associated seals;

FIG. 7 is a sectional view of the trailer wheel bearing housing and the manner of air passage from the present tow bar, which is illustrated schematically.

Figure 1:
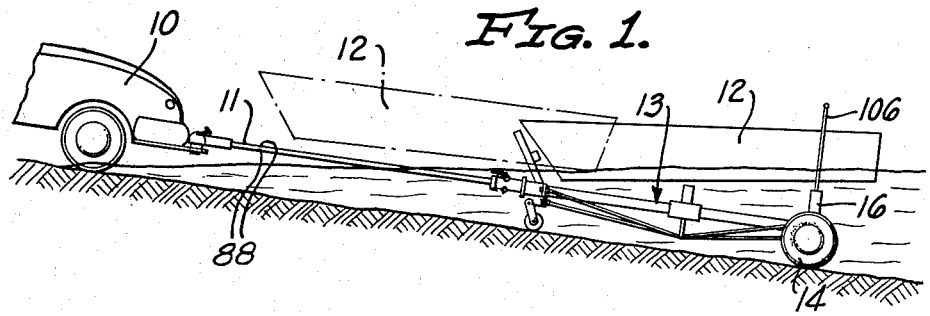
FIG. 1 is a side elevational view of the present tow bar as a part of a boat trailer, and being utilized to launch a boat.
Figure 2:
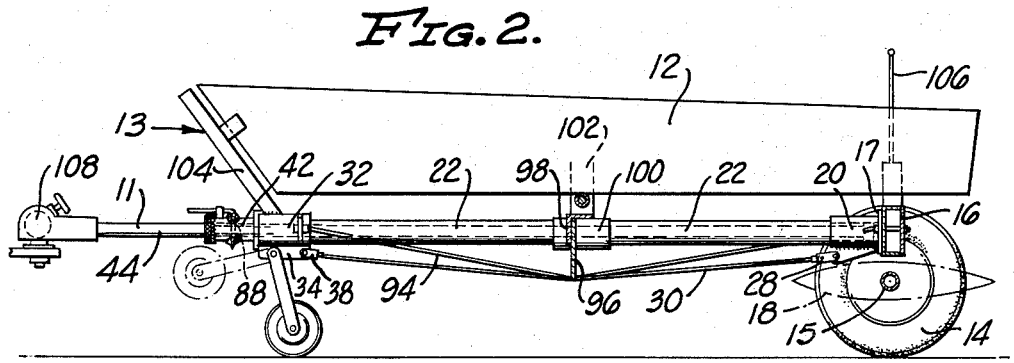
FIG. 2 is an enlarged side elevational view of the boat trailer and tow bar of FIG. 1.
Figure 3:
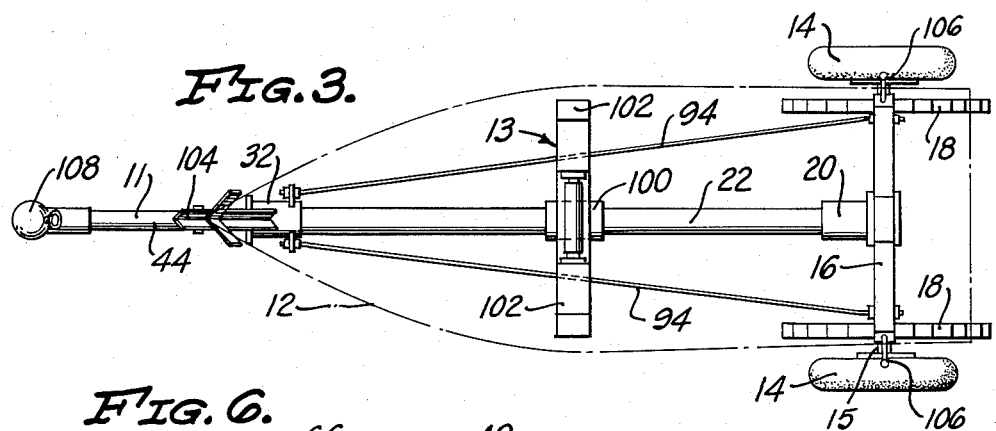
FIG. 3 is a top plan view of the boat trailer and tow bar of FIG. 2.
Figure 6:
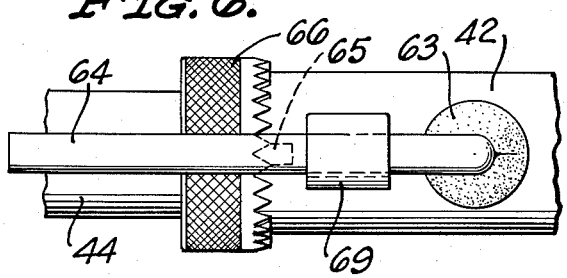
FIG. 6 is a top plan view of the locking rod and associated seals of FIG. 5.

Referring now to the drawings, and particularly to FIGS. 1–4 thereof, there is illustrated any suitable type of towing vehicle 10, to which is attachable the pressure equalizing tow bar 11 of the present invention for hauling a boat 12 upon a trailer 13.

The trailer 13 may be of any type suitable for the particular boat to be hauled, in the present instance being constituted by a pair of usual wheels 14, which are supported by an axle 15, a transversely disposed frame element 16, which is hollow and preferably rectangular in cross section, and a pair of usual springs 18 for absorbing road shocks.

A plate 17 is welded to the forward face of the frame element 16, and is also welded to the rear extremity of a longitudinally extending cylindrical support 20, sealing off that end of the support 20. The forwardly extending extremity of the support 20 is interiorly threaded to receive a longitudinally extending hollow section or tubular element 22, thereby supporting the tubular element in fixed position relative to the trailer 13. The cylinder 20 also acts as an anchorage for a tie bar 30, and for this purpose is provided with a downwardly extending projection 24 having an opening 26 for receiving a clevis fitting 28, which is carried on the rearward extremity of a longitudinally disposed rod or tie bar 30.

The forward extremity of the tie bar 30 is similarly anchored to a longitudinally oriented cylindrical support 32 which is interiorly threaded to receive the forward extremity of the tube 22, it being noted that the length of the tube 22 is approximately the same as that of the boat 12. The forward extremity of the tie bar 30 carries a clevis fitting 38 which is secured within an opening 36 provided in a downwardly extending projection 34 which is integral with the cylindrical support 32.

The forward extremity of the support 32 threadably receives a flanged cylinder 40 which, in turn, receives a forwardly extending, longitudinally oriented tubular sleeve 42, being welded thereto at 43, as best illustrated in FIG. 4. Thus, the cylindrical support 20, the tube 22, the cylinder 40, and the cylindrical support 32 constitute structure which is fixed to the trailer 13 and forms, as will be seen, the cylinder of a piston-cylinder arrangement.

The piston portion of this piston-cylinder arrangement includes a longitudinally extending hollow section or tubular element 44 having a length slightly greater than the tubular element 22, and telescopically slidable therewithin. More particularly, the rearward extremity of the tubular element 44 is slidably disposed through the tubular sleeve 42, and is exteriorly threaded to accept the skirt of a cylindrical piston head 46 which is longitudinally slidable within the tubular element 22.

An important feature of the piston head 46 is the provision therein of a centrally located orifice fitting 48 having a metering passageway 50 therethrough to permit air to pass between the interiors of the tubular elements 22 and 44. The size of the orifice is a major factor in controlling the rapidity of relative extension and retraction of the elements 22 and 44, as will be seen, and is made relatively large or relatively small, depending upon the cushioning or dash-pot effect desired.

The rearward face of the piston head 46 is adhered or otherwise secured to a disk-shaped cushion or buffer 52 which has a central opening to permit air to pass into and out of the orifice fitting 48. The buffer 52 cushions the contact or engagement between the piston head 46 and the plate 17 which may occur violently upon retraction of the tubular element 22 within the tubular element 44, and also acts as a sliding seal with the tubular element 22.

A cushioning effect is also provided by a resilient, laminated annular sealing means or element 54 disposed about the tubular element 44 between the forward edge or face of the skirt of the piston head 46 and an annular retaining ring 56 to which it is bonded. The ring 56 is slidable relative to the tubular element 44 and is fixedly seated against the rearward extremities of the flanged cylinder 40 and the tubular sleeve 42. Accordingly, when the tubular elements 22 and 44 reach their extended positions, the sealing element 54 is compressed between the piston head 46 and the retaining ring 56, causing a circumferential expansion of the sealing element 54 which provides a substantially tight frictional seal.

In order to permit the tubular element 44 to be locked in its extended position, it is provided at its inner or rearward extremity with a pair of transversely aligned openings which are also aligned with a transverse opening provided in a solid reinforcing plug 58 which is secured within the tubular element 44. Two corresponding openings 60 are provided in the sleeve 42, so that the tubular element 44 can be fixed or locked relative to the tubular element 22 by the insertion of an L-shaped rod 62 into the openings 60 and into the openings of the element 44 and the plug 58. The end of the rod 62 is provided with a tapered or pointed tip to facilitate such insertion, and also to facilitate passage of the rod 62 through a pair of hemispherical seals 63 which are adhesively secured to the exterior periphery of the sleeve 42 to provide a fluid tight seal between the rod 62 and the sleeve 42. The openings 60 and the corresponding openings of the element 44, and the plug 58, are preferably arranged to be slidably out of alignment when the seal 54 is engaged at its opposite edges, so that forceable insertion of the tapered end of the rod 62 further extends the tubular elements 22 and 44 to compress the sealing element 54 to provide a good seal.

The seals 63 are made of any suitable resilient material such as plastic and, prior to insertion of the rod 62, are tightly compressed along their juxtaposed lips or faces to exclude water and the like. However, the seals 63 are resiliently distortable to permit insertion of the rod 62, as best illustrated in FIG. 5, and also to provide intimate contact therewith for sealing purposes.

The rod 62 includes a handle 64 having an integral, downwardly projecting pawl tooth 65 which is adapted to engage the rearwardly oriented serrations or teeth of a cylindrical cap 66 which is interiorly threaded for securement to the forward extremity of the sleeve 42. Manipulation of the handle 64 is adapted to rotate the cap 66 upon the sleeve 42. The seal 67 is resilient and sealably engages the cap 66, sleeve 42, and tubular element 44 to prevent fluid leakage therebetween.

More particularly, when the rod handle 64 is rotated in one direction, the pawl tooth 65 thereof engages one of the teeth of the cap 66 and rotates it to effect the described seal. Rotation of the rod handle 64 in the opposite direction rotates the cap 66 in the reverse direction to release the seal. Preliminary adjustment of the position of the cap 66 relative to the pawl tooth 65 is made by hand. In addition, a laterally projecting, L-shaped retainer 69 is secured to the exterior of the sleeve 42 and frictionally engages the handle 64 to maintain it in the position illustrated.

To enable the locking together of the tubular elements 22 and 44 in their retracted positions, a pair of aligned openings 88 are provided at the forward extremity of the tube 44 (FIG. 2), and the rod 62 is also insertable therein, as will be apparent. This not only provides a seal against fluid and dirt, but the action of the seal 67 prevents chattering of the affected components during transportation of the trailer 13.

Referring particularly now to FIG. 7, the tow bar 11 is illustrated schematically, and in combination with a more detailed showing of one of the wheels 14. Each wheel 14 is constituted by the usual radially extending tire mounting flange 70, and wheel bearing housing 71 defining a wheel bearing chamber 72 which is sealed against dirt and moisture by a cap 74 and a pair of usual dual seals 76. A conventional wheel spindle 78 secured to one extremity of the axle 15, which in this case is hollow, extends into the bearing chamber 72 and is rotatably supported therein by a pair of conventional, spaced apart wheel bearings 80.

The wheel bearings 80 will inevitably become heated when the boat 12 is being transported over land by the trailer 13 so that when the trailer 13 is backed into water for launching of the boat 12, the wheel bearings 80 and associated components will be quickly cooled. This causes the air pressure in the wheel bearing chamber 72 to quickly drop, creating a high pressure differential with the pressure of the surrounding water so that water commonly flows or is sucked into the wheel bearing chamber 72. This is highly undesirable since corrosion of the wheel bearings 80 quickly occurs, particularly if the water is salt water. The usual water and oil seals, such as the seals 76, have been found to be incapable of preventing this ingress of water.

Accordingly, the wheel spindle 78 is provided with an axial air passage 82 which connects with a pair of radially extending air passages 84 opening into the wheel bearing chamber 72. The passage 82 communicates with the sealed, hollow interior of the axle 15, and the axle 15 is provided with an opening in the wall thereof which opens into a flexible air hose 86. The other end of the air hose 86 is connected in fluid communication with the interior of the tubular element 22 at a point which is preferably spaced from the forward end of the element 22 a distance which is approximately equal to one-third to one-half the length thereof. As will be seen, this keeps within safe limits the differential pressure resulting upon relative movement of the telescoping elements 22 and 44, the exact location of the air take-off from the wheel bearing chamber 72 varying with the size of the tubular element 22 and the associated air passageways.

It is to be noted that if the trailer utilized with the present tow bar 11 were provided with wheel spindles mounted to swing-arms, the air hoses 86 would be attached directly to the wheel spindles since no hollow axle would exist. The ingress of air to the interior of the tubular elements 44 and 22 is through the openings 88 formed in the inner tubular element 44. As most clearly shown in FIG. 1 of the drawings, the openings 88 are disposed above the surface of the water when the inner and outer elements 44 and 22, respectively, are located in extended positions.

Therefore, pressure differentials which might occur in the wheel bearing chamber 72 because of immersion cooling thereof are equalized by air flowing from the atmosphere through the openings 88 in the forward extremity of the inner tubular element 44, located above the surface of the water, FIG. 1. The air then flows through the inner tubular element 44. From the hollow interior of the inner tubular element 44, the air flows through a pair of longitudinal air passages 90 provided in the reinforcing plug 98 and through a metering passageway 50 located in the fitting 48.

When the inner tubular element 44 is in the extended position of FIG. 1, the outlet from the interior of the outer tubular element 22 is located to the right-hand side of the piston shown in FIG. 7 of the drawings so that air flows through the tube 86 from a chamber defined between the piston 46 and the right-hand extremity of the tubular element 22. Therefore, even though the wheel bearing chambers 72 are submerged they are continuously maintained in communication with the ambient air by the previously described openings and passageways.

The supporting and bracing framework for the trailer 13 is relatively light in weight, although quite sturdy, and includes a pair of longitudinally oriented tie rods 94 whose forward extremities are secured in any suitable fashion to the cylindrical support 32, and whose rearward extremities are similarly secured to the transverse frame element 16. The midportions of the tie bars 72 and the tie bar 30 are braced by a depending flange 96 integral with a transversely oriented crosspiece 98, which is welded to a cylindrical support or frame member 100 rigidly secured to the midportion of the tubular frame element 22.

The crosspiece 98 includes a pair of upwardly extending, transversely spaced apart braces 102 for engaging the sides of the boat 12 to maintain it in proper position upon the trailer 13.

The bow of the boat 12 is properly located relative to the trailer 13 by an upwardly and forwardly projecting bow bar 104 whch is welded to the cylindrical support 32. The stern section of the boat 12 is maintained in position over the trailer 13 by a pair of transversely spaced apart, upwardly extending rods 106 which are rigidly secured, respectively, to the extremities of the transverse frame element 16. The upright rods 106 are also used as guides to identify the location of the trailer 13 when the boat 12 is being floated into position upon the submerged trailer 12. Any suitable connection, such as a usual ball and socket joint connection 108, may be utilized at the forward end of the transverse element 44 to connect the trailer 13 to the towing vehicle 10.

In operation, the trailer 13 is utilized to launch the boat 12 thereon by removing the rod 62, extending the tubular elements 22 and 44, locking them together again with the rod 62, and backing the trailer 13 into the water, as best illustrated in FIG. 1, the beach or shore sloping downwardly so that the trailer 13 is submerged, with the towing vehicle 10 ashore. Upon removal of the rod 62 from the retracted tubular elements 22 and 44, it will be noted that the rapidity of extension of the elements 22 and 44 is controlled by the metering of air through the orifice fitting 48, and by a limited leakage of air past the peripheries of the piston head 46 and the seal 52, and past the seals 54 and 67. This leaking of air is always from the interior of the tow bar 11 to the exterior thereof because of the provision of the equalizing orifice 92, so that the leaking air cleanses the seals 54 and 67 of foreign matter each time the tow bar 11 is extended or retracted.

The above-described metering of air flow through the tow bar 11 establishes low pressure differentials to produce relatively slow and safe operation of the tow bar 11 during extension and retraction, and also provides high pressure differentials when rapid relative movements of the tubular elements 22 and 44 are attempted, thereby preventing dangerously rapid operation of the tow bar 11.

When the tubular elements 22 and 44 are fully extended, the trailer 13 will usually be sufficiently submerged to permit launching of the boat 12, the elements 22 and 44 first being locked in their extended positions by insertion of the rod 62 into the mating openings thereof. This also produces an additional seal against water ingress, as previously described.

After the boat 12 is launched, the trailer 13 is towed out of the water, preferably with the tow bar 11 extended. As will be apparent, the operation is reversed to float the boat 12 upon the trailer 13, and the re-insertion of the rod 62 in the retracted tubular elements 22 and 44 permits the trailer 13 to then be towed over land.

Thus, there has been provided a tow bar 11 which is telescopically extensible to permit a boat trailer to roll into the water for flotation of the boat thereon, the telescopic sections of the tow bar being controlled in their relative extension and retraction by controlling the extent of air flow past piston-cylinder components of the sections. Moreover, the telescopic sections provide an avenue for air passage from the atmosphere to the trailer wheel bearing housings so that the usual cooling of the wheel bearings, upon water immersion of the bearing housings, does not have the undesirable effect of sucking water into the housings. Instead, the low pressure in the housings is relieved by air introduced from the atmosphere.

While the invention has been described by means of specific examples and specific embodiments, the invention is not limited thereto since obvious modifications and variations will occur to those skilled in the art without departing from the spirit and scope of the invention as defined by the appended claims.

We claim:

1. A telescopic tow bar for a boat trailer having a plurality of wheel bearing housings, said tow bar comprising: a first longitudinally extending section connected to the boat trailer; a second longitudinally extending section adapted to be connected to a towing vehicle, said first and second sections being slidable in telescoping relationship; and means providing a passage for air from the trailer wheel bearing housings to said first section, said sections including internal air passages communicating with the atmosphere adjacent the forward extremity of said second section.

2. A telescopic tow bar for a boat trailer having a plurality of wheel bearing housings, said tow bar comprising: a first longitudinally extending section connected to the boat trailer; a second longitudinally extending section adapted to be connected to a towing vehicle, said first and second sections being hollow and slidable in telescoping relationship; and means providing a passage for air from the trailer wheel bearing housings to said first section, said second section having an opening adjacent its forward extremity communicating with the atmosphere whereby an air path is provided from the atmosphere into said trailer wheel bearing housing.

3. In a boat trailer having a plurality of wheel bearing housings, the combination of: a telescopic tow bar having longitudinally extending air passages therethrough, and an opening in the forward extremity thereof connecting said passages to the atmosphere; and means providing a passage for air from the trailer wheel bearing housings to the rearward extremity of said tow bar to substantially equalize the pressures in said wheel bearing housings and said air passages of said tow bar.

4. In a boat trailer having wheel bearing housings, the combination of: a telescopable tow bar adapted to connect the boat trailer to a towing vehicle; and means providing air passages from the boat trailer wheel bearing housings through the tow bar and to the atmosphere at a point adjacent the forward extremity of the tow bar.

5. In a boat trailer having wheel bearing housings, the combination of: a hollow telescopable tow bar adapted to connect the boat trailer to a towing vehicle; wheel spindles rotatably carrying the wheel bearing housings, and including air passages opening into said housings; and air conduit means connected to said passages and to said tow bar to substantially equalize the pressure therebetween, said tow bar being sealed except for an opening to said air conduit means and an opening to the atmosphere at a point adjacent the forward extremity of said tow bar.

6. In a boat trailer having wheel bearing housings, the combination of: a hollow telescopable tow bar adapted to connect the boat trailer to a towing vehicle; a hollow axle; wheel spindles mounted at opposite ends of said axle and rotatably carrying the wheel bearing housings, and including air passages opening into said housings; and air conduit means connected to said passages and to said hollow axle to substantially equalize the pressure therebetween, said tow bar being sealed except for an opening to said air conduit means and an opening to the atmosphere at a point adjacent the forward extremity of said tow bar.

7. In a boat trailer having wheel bearing housings, the combination of: a hollow telescopable tow bar including a piston-section adapted to connect the boat trailer to a towing vehicle, and a cylinder section carried by the boat trailer; and means providing air passages from the boat trailer wheel bearing housing through the tow bar and to the atmosphere, said passages including an opening in said cylinder section leading to said wheel bearing housings, an opening in said piston section at a point adjacent the forward extremity of the tow bar, and an opening between said piston section and said cylinder section.

8. In a boat trailer having wheel bearing housings, the combination of: a hollow telescopable tow bar including a piston section adapted to connect the boat trailer to a towing vehicle, and a cylinder section carried by the boat trailer; and means providing air passages from the boat trailer wheel bearing housings through the tow bar and to the atmosphere, said passages including an opening in said cylinder section leading to said wheel bearing housings, an opening in said piston section at a point adjacent the forward extremity of the tow bar, an orifice in said piston section opening into one end of said cylinder section to regulate the rapidity of telescoping of the tow bar, and an equalizing opening in said piston section opening into the other end of said cylinder section to substantially equalize the pressures in said piston section and said wheel bearing housings.

9. In a boat trailer having wheel bearing housings, the combination of: a telescopable tow bar having a pair of mutually slidable sections adapted to connect the boat trailer to a towing vehicle, said tow bar including internal air passages affording communication between the interior of said tow bar and the atmosphere adjacent the forward extremity of the tow bar; wheel spindles carried by the trailer for rotatably supporting the trailer wheel bearing housing, said spindles including air passages opening into the interior of said wheel bearing housing; means connecting said air passages of said wheel spindles with the interior of said tow bar whereby pressures in said wheel bearing housings and in said tow bar are substantially equalized, said tow bar being sealed except at its forward extremity and at the connection thereof to said means; a cap member rotatably mounted upon one of said sections and encompassing the other of said sections; and a seal member disposed adjacent said sections and encompassed by said cap member whereby rotation of said cap member is adapted to distort said seal member into sealing relationship with said sections.

10. In a boat trailer having wheel bearing housings, the combination of: a telescopable tow bar having a forward section and a rearward section mutually slidable and adapted to connect the boat trailer to a towing vehicle, said tow bar including internal air passages affording communication between the interior of said tow bar and the atmosphere adjacent the forward extremity of the tow bar; wheel spindles carried by the trailer for rotatably supporting the trailer wheel bearing housing, said spindles including air passages opening into the interior of said wheel bearing housing; means connecting said air passages of said wheel spindles with the interior of said tow bar whereby pressures in said wheel bearing housings and in said tow bar are substantially equalized, said tow bar being sealed except at its forward extremity and at the connection thereof to said means; a cap member rotatably mounted upon said rearward section and encompassing said forward section; a seal member disposed adjacent said sections and encompassed by said cap member whereby rotation of said cap member is adapted to distort said seal member into sealing relationship with said sections; said forward section having transverse openings in both extremities thereof, said rearward section having corresponding, normally closed transverse openings in its forward extremity; and a locking element insertable into corresponding ones of said transverse openings of said forward and rearward sections for locking the same in retracted or extended positions, said locking element being engageable with said cap member and movable to rotate said cap member.

11. In a boat trailer having wheel bearing housings, the combination of: a telescopable tow bar adapted to connect the boat trailer to a towing vehicle, said tow bar including internal air passages affording communication with the atmosphere adjacent the forward extremity of the tow bar; wheel spindles carried by the trailer for rotatably supporting the trailer wheel bearing housings, said spindles including air passages opening into the interior of said wheel bearing housings; means opening into said air passages and connecting said wheel spindles with the interior of said tow bar whereby pressures in said wheel bearing housings and in said tow bar are substantially equalized; a rod for locking said telescopable tow bar in its extended and retracted positions, respectively, said telescopable tow bar including transverse openings therethrough for receiving said rod in said extended and retracted positions; and seals upon the exterior of said tow bar adjacent said transverse openings for normally sealing said transverse openings, said seals being distortable to receive said rod in sealing relationship during receipt of said rod in said transverse openings.

12. In a boat trailer having wheel bearing housings, the combination of: a hollow telescopable tow bar adapted to connect the boat trailer to a towing vehicle, said tow bar including an opening to the atmosphere adjacent its forward extremity; wheel spindles carried by the trailer for rotatably supporting the trailer wheel bearing housings, said spindles including air passages opening into the interior of said wheel bearing housings; and means connecting said air passages of said wheel spindles with the interior of said tow bar whereby pressures in said wheel bearing housings and in said tow bar are substantially equalized, said tow bar including means for regulating the passage of air between the telescoping portions thereof, and for regulating the passage of air between said telescoping portions and said wheel bearing housings.

References Cited in the file of this patent

UNITED STATES PATENTS

| | | |
|---|---|---|
| 3,032,353 | Williams et al. | May 1, 1962 |
| 3,044,567 | Reed et al. | July 17, 1962 |